United States Patent Office
3,417,060
Patented Dec. 17, 1968

3,417,060
POLYETHERS CONTAINING THIOETHER
SIDE CHAINS
David S. Breslow, Wilmington, Del., assignor to Hercules Incorporated, Wilmington, Del., a corporation of Delaware
No Drawing. Filed Aug. 7, 1967, Ser. No. 658,617
8 Claims. (Cl. 260—79)

ABSTRACT OF THE DISCLOSURE

High molecular weight polyethers of improved stability contain ether units with thioether side chains, i.e.,

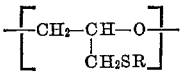

units where R is an alkyl, aryl, alkenyl, etc. radical. These polyethers are prepared by reacting a polymer of an epihalohydrin such as, for example, poly(epichlorohydrin) or epichlorohydrin-ethylene oxide copolymers with a metal salt of a mercapto compound RSH (where R is as above) which is typically methyl mercaptan, thiophenol, 4-tert-butylthiophenol, etc.

---

This invention relates to polyethers and, more particularly, to high molecular weight polyethers containing thioether side chains and to a process for preparing the same.

Polyethers produced by the homo- and copolymerization of epoxides (oxiranes) and oxetanes are well known. Many of these have pendant side chains from the main polymer backbone, which side chains contain halogen, as, for example, halomethyl groups, ether groups, as, for example, alkyloxyalkyl groups, and olefinic unsaturation, as, for example, alkenyl and alkenyloxyalkyl groups. However, such polymers with pendant thioether groups have not previously been known.

Now, in accordance with this invention, a new class of polyethers has been discovered, which polyethers have pendant thioether groups. These new polymers have entirely different properties from the prior art polyethers, outstanding of which is their oxidative stability and ability to stabilize other polymers due to their "built-in" stabilizing groups.

The polymers of this invention are high molecular weight polyethers, i.e., polyethers having an RSV greater than about 0.2 and preferably greater than about 0.5 (corresponding to a molecular weight greater than about 20,000 and preferably greater than about 50,000), wherein from 0 to 99.9% of the repeating units are epihalohydrin units, i.e., units of the formula

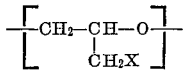

where X is halogen, from 0 to 95% of the repeating units are units of at least one other cyclic oxide, and wherein from 0.1 to 100% of the repeating units of the polyether have the formula

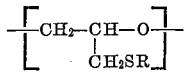

where R is selected from the group consisting of alkyl, cycloalkyl, haloalkyl, alkoxyalkyl, alkylthioalkyl, aralkyl, aryl, alkyl, haloaryl, alkenyl, and cycloalkenyl radicals. Suitable R substituents include alkyl groups containing 1 to 20 carbon atoms such as methyl, ethyl, propyl, butyl, hexyl, octyl, dodecyl, octadecyl and the like; cycloalkyl groups containing from 5 to 14 carbon atoms such as cyclopentyl, cyclohexyl, methylcyclohexyl, methylisopropylcyclohexyl, 2,3- or 2,4-dimethylcyclohexyl, and the like; haloalkyl groups containing 1 to 6 carbon atoms such as the primary, secondary, or tertiary linear or branched alkyl groups containing one or more chlorine, bromine, fluorine, and/or iodine substituents, and particularly trichloromethyl, chloroethyl, chloropropyl, chlorohexyl, and the like; alkoxyalkyl groups containing 2 to 8 carbon atoms such as methoxymethyl, methoxyethyl, methoxyhexyl, ethoxyethyl, and the like; alkylthioalkyl groups containing 2 to 8 carbon atoms such as methylthiomethyl, ethylthioethyl, ethylthiohexyl, and the like; aralkyl groups containing from 7 to 20 carbon atoms such as phenylmethyl, naphthylbutyl, phenylhexyl, phenylpropyl, and the like; alkenyl groups containing 3 to 8 carbon atoms such as allyl, methallyl, isobutenyl, crotyl, and the like; cycloalkenyl groups containing 6 to 12 carbon atoms such as cyclohexenyl, methylcyclohexenyl, methylisopropylcyclohexenyl, and the like; aryl groups containing 6 to 18 carbon atoms such as phenyl, naphthyl, diphenyl, terphenyl, anthracenyl, and the like; alkaryl groups containing 7 to 18 carbon atoms such as tolyl, xylyl, cumyl, tert-butylphenyl, nonylphenyl, methylnaphthyl, isopropyldiphenyl, tert-butylnaphthyl, and the like; and haloaryl radicals containing 6 to 18 carbon atoms and one or more halogen atoms which can be chlorine, bromine, fluorine, and/or iodine, and particularly chlorophenyl, dichlorophenyl, tetrachloronaphthyl, and the like.

The new polyethers of this invention are prepared by reacting a polymer of an epihalohydrin with a metal salt of a mercapto compound of the formula RSH, where R is as stated above. Exemplary of the mercapto compounds which can be utilized are the alkyl mercaptans such as methyl mercaptan, ethyl mercaptan, n-propyl or isopropyl mercaptan, n-butyl, sec-butyl, isobuytl or tert-butyl mercaptan, hexyl mercaptan, n-octyl mercaptan, n-dodecyl mercaptan, tert-octyl mercaptan, tert-dodecyl mercaptan, tert-hexadecyl mercaptan, n-octadecyl mercaptan, and the like; the cycloalkyl mercaptans such as cyclohexyl mercaptan, cyclohexylmethyl mercaptan, methylcyclohexyl mercaptan, methylisopropylcyclohexyl mercaptan, 2,3-dimethylcyclohexyl mercaptan, 2,4-dimethylcyclohexyl mercaptan, tert-butylcyclohexyl mercaptan, and the like; the haloalkyl mercaptans such as 3-chloropropyl mercaptan, trichloromethyl mercaptan, β-chloroethyl mercaptan, and the like; alkoxyalkyl mercaptans such as methoxy methyl mercaptan, methoxyhexyl mercaptan, ethoxyethyl mercaptan, and the like; alkylthioalkyl mercaptans such as methylthiomethyl mercaptan, ethylthioethyl mercaptan, and the like; aralkyl mercaptans such as triphenylmethyl mercaptan, β-phenylethyl mercaptan, α-naphthylbutyl mercaptan, phenylhexyl mercaptan, and the like; alkenyl mercaptans such as allyl mercaptan, isobutenyl mercaptan, crotyl mercaptan, and the like; cycloalkenyl mercaptans such as cyclohexenyl mercaptan, methylcyclohexenyl mercaptan, methylisopropylcyclohexenyl mercaptan, and the like; aryl mercaptans such as thiophenol, thionaphthol, mercaptodiphenyl, mercaptoanthracene, and the like; alkaryl mercaptans such as 4-tert-butylthiophenol, 4-tert-butyl-o-thiocresol, m-thiocresol, p-methylthiophenol, o-ethylthiophenol, o-n-propylthiophenol, o-isopropylthiophenol, p-isopropylthiophenol, 2,6-dimethyl-4-tert-butylthiophenol, and the like; and haloaryl mercaptans such as o-bromothiophenol, o-iodothiophenol, m-bromothiophenol, p-fluorothiophenol, p-chlorothiophenol, p-bromothiophenol, m-trifluoromethylthiophenol, 2,4,6-trichlorothiophenol, and the like. The metal component of the mercapto reactant can be any salt-forming metal and is preferably a Group I-A, II-A, II-B, III-A, IV-A or VIII metal such as sodium, potassium, lithium, magnesium, calcium, strontium, barium, zinc, cadmium, aluminum, tin, lead, iron, cobalt or nickel.

The metal salts of the mercapto compounds can be preformed and used as such in the reaction or can be formed in situ during the reaction by the separate addition of the desired mercapto compound and the necessary amount of a basic compound containing the desired metal such as sodium hydroxide, lithium hydroxide, potassium hydroxide, magnesium oxide, calcium oxide, calcium stearate, strontium oxide, barium hydroxide, zinc oxide, zinc stearate, cadmium hydroxide, aluminum oxide, aluminum hydroxide, stannous or stannic hydroxide, lead oxide, the oxides of iron, cobalt or nickel, nickel stearate and the like, to the reaction medium.

The polymers of epihalohydrin which are reacted with the salt of the mercapto compounds of this invention are the crystalline and amorphous homo- and copolymers produced from any epihalohydrin, e.g., epichlorohydrin, epibromohydrin, epiiodohydrin, or epifluorohydrin, or any mixture thereof, and the known crystalline and amorphous copolymers of an epihalohydrin, preferably epichlorohydrin, with from 5 to 95%, and preferably with from 20 to 80% by weight of the total monomers of at least one other cyclic oxide which is preferably an oxetane or oxirane. Specific oxetanes and oxiranes which can be copolymerized with epihalohydrin include the alkylene oxides having 1 to 20 carbon atoms, such as, for example, ethylene oxide, propylene oxide, butene-1 oxide, cis- and trans-butene-2-oxide; the cycloaliphatic epoxides containing 6 to 12 carbons such as cyclohexene oxide, and the like; the phenyl alkylene oxides such as styrene oxide, etc.; the saturated glycidyl ethers such as methyl glycidyl ether, ethyl glycidyl ether, phenyl glycidyl ether, etc.; the ethylenically unsaturated epoxides such as the unsaturated glycidyl ethers, the monoepoxides of dienes or polyenes or the glycidyl esters, etc.; and the oxetanes such as oxetane, also designated as trimethylene oxide, the 2- or 3-monosubstituted oxetanes or the 2,2- or 3,3-disubstituted oxetanes. Other cyclic oxides suitable for use with the epihalohydrin include the tetrahydrofurans such as tetrahydrofuran, 2-, 3-, and 4-methyltetrahydrofuran, 2,3-dimethyltetrahydrofuran, 2,3,4-trimethyltetrahydrofuran, 2,3-diethyltetrahydrofuran, 2,3-diphenyltetrahydrofuran, and the like. Exemplary of suitable polymers are those described in U.S. Patents 3,058,922, 3,158,580, 3,158,581 and 3,158,591.

Although the particular conditions for preparing the polyethers containing thioether side chains will vary depending on the starting polyether and the particular mercapto compound used, the reaction is usually carried out in bulk, in diluent dispersion, or in a solvent for the polyether at temperatures varying from 0° C. to 250° C., and preferably at from about 30° C. to about 180° C. using from a stoichiometric amount up to a large excess of the amount of the mercapto compound necessary for the desired degree of substitution. Suitable diluents or solvents are numerous and varied and include, for example, benzene, toluene, xylene, acetone, dimethylsulfoxide, dimethylformamide, hexamethylphosphoramide, acetonitrile, dioxane, tetrahydrofuran, etc., and mixtures thereof. Diluents or solvents such as water, alcohols, phenols, and the like can also be used, but inert diluents are preferred.

The following examples illustrate the preparation of the polyethers containing thioether side chains of this invention. All parts and percentages are by weight unless otherwise indicated. The toluene, xylene, and dimethylsulfoxide (DMSO) used as solvents in the examples were dried prior to use by passage through a molecular sieve column. The molecular weight of the polymers is indicated by their reduced specific viscosities (RSV). By the term "reduced specific viscosity" is meant the $\eta$sp./C. determined on a 0.1% solution in α-chloronaphthalene at 100° C. The reactions were all carried out under nitrogen unless otherwise indicated.

EXAMPLE 1

To 5 parts of a predominantly amorphous poly(epichlorohydrin) containing 1% of phenyl-β-naphthylamine as stabilizer and having an RSV of 1.4 (weight average molecular weight of 500,000) dissolved in 95 parts of dimethyl sulfoxide at 25° C. was added a slurry of 5 parts of sodium hydroxide in 11 parts of dimethyl sulfoxide. A solution of 7.0 parts of thiophenol in 8 parts of dimethyl sulfoxide was then added dropwise at a rate such that the reaction temperature did not rise more than 10° C. above ambient. The reaction mixture was heated to 60 to 70° C. and was maintained at that temperature for an additional 2 hours, with stirring, after which time the reaction mixture was poured slowly into 405 parts of methanol with stirring. The inosluble product was filtered from the methanol mixture and the product was purified by twice dissolving the product in toluene and precipitating with methanol. The product (8.1 parts) was a rubber which contained, by analysis, 17.1% sulfur and 4.8% chlorine, indicating that the product contained 88%

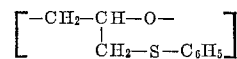

units and 12% epichlorohydrin units.

EXAMPLE 2

The procedure of Example 1 was repeated except that 10 times the amount of reactants and solvents were used, and the reaction mixture was stirred for 6 hours at 75° C., after which time the mixture was cooled and poured into 5,000 parts of water in a blender. The water-insoluble product was collected and, after washing twice with methanol, was treated with 440 parts of benzene. The benzene-insoluble product was collected by centrifugation and then was dried to give 7.0 parts of polymer which on analysis was shown to contain 16.05% sulfur and 0.13% chlorine, indicating that the polymer contained 83%

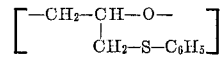

units and 0.3% epichlorohydrin unit.

The benezene-soluble product was recovered by evaporating the benzene and drying to give 47.6 parts of polymer which on analysis was shown to contain 18.4% sulfur and 0.28% chlorine, indicating that the benzene-soluble polymer contained 95%

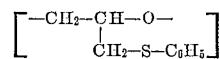

units and 0.7% epichlorohydrin unit.

EXAMPLE 3

To 10 parts of the poly(epichlorohydrin) of Example 1 dissolved in 210 parts of dimethyl sulfoxide at 25° C. was added a slurry of 10 parts of sodium hydroxide in 22 parts of dimethyl sulfoxide and then a solution of 24.2 parts of 4-tert-butyl thiophenol in 16 parts of dimethyl sulfoxide was added according to the procedure of Example 1. The reaction mixture was maintained at 75° C. for an additional 6 hours, with stirring, after which time the reaction mixture was cooled and poured slowly into 1,000 parts of water in a blender. The water-insoluble product was collected and, after washing twice with methanol, was treated with 176 parts of benzene. The polymer was precipitated from the benzene solution by adding 1,200 parts of methanol, and the polymer so precipitated was collected and dried. The benzene-soluble polymer product (19.6 parts) contained, based on sulfur and chlorine analysis, 18% epichlorohydrin units and 82%

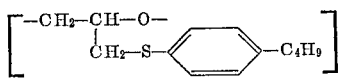

units.

EXAMPLE 4

Example 3 was repeated except that 26 parts of 4-tert-butyl-o-thiocresol was substituted for the 24.2 parts of 4-tert-butylthiophenol. The benzene-soluble, methanol-insoluble polymer (17.5 parts) contained, based on sulfur and chlorine analysis, 24% epichlorohydrin units and 76%

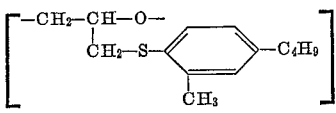

units.

EXAMPLE 5

To 50 parts of the poly(epichlorohydrin) of Example 1 dissolved in 950 parts of dimethyl sulfoxide at 25° C. was added a slurry of 2.5 parts of powdered sodium hydroxide in 22 parts of dimethyl sulfoxide and then a solution of 7.0 parts of thiophenol in 50 parts of dimethyl sulfoxide, according to the procedure of Example 1. The reaction mixture was stirred at 75° C. for 6 hours after which time the reaction mixture was poured slowly into 6,000 parts of methanol with stirring. The polymer which precipitated was collected from the methanol mixture and the polymer was washed several times with methanol and once with a 0.2% methanolic solution of 4,4'-thiobis(3-methyl-6-tert-butylphenol) and then dried. The product was 55 parts of a tough, amorphous (by X-ray) rubber having an RSV of 1.2 and containing, based on sulfur analysis, 18% of

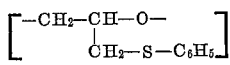

units. The product had improved heat stability in air as compared with amorphous poly(epichlorohydrin).

EXAMPLE 6

Example 5 was repeated except that 0.25 part of sodium hydroxide and 0.7 part of thiophenol were used. The polymer product was 50 parts of a tough, amorphous rubber having an RSV of 1.4 and containing, based on sulfur analysis, 1.5% of

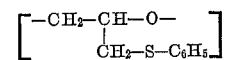

units.

EXAMPLE 7

Five (5) parts of an epichlorohydrin-ethylene oxide copolymer (69.5% by weight epichlorohydrin) of RSV 5.7, containing 0.7% stabilizer [the reaction product of 1 mole of crotonaldehyde and 3 moles of 3-methyl-6-tert-butylphenol, the product being essentially 1,1,3-tris(2-methyl-4-hydroxy-5-tert-butylphenyl)butane], and having a sulfate ash of 0.02%, was dissolved in 138 parts of dimethyl sulfoxide at 65° C. Then 0.14 part of methyl mercaptan and 0.23 part of ground sodium hydroxide was added to the solution as a dispersion in 13 parts of dimethyl sulfoxide and the reaction mixture maintained at 65° C. for 6.3 hours, with stirring, after which time the reaction was short-stopped with 4 parts of anhydrous ethanol. Polymer was isolated by adding 30 parts of 3% aqueous hydrogen chloride and 2 volumes of water to the short-stopped reaction mixture, and the insoluble portion was collected, washed neutral with water, and dried for 16 hours under vacuum. The acidified water-insoluble product (5 parts) was a tough, amorphous rubber having an RSV of 4.0 and, based on sulfur anlysis, contained 5.8% of

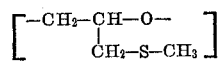

units. It had improved heat stability in air as compared with the starting copolymer.

EXAMPLES 8–10

The procedure of Example 7 was repeated except that in these examples 0.59 part of tert-dodecyl mercaptan (Example 8), 0.50 part of carbomethyl mercaptan (Example 9), or 0.32 part of thiophenol (Example 10) was substituted for 0.14 part of methyl mercaptan. The acidified water-insoluble products of these examples were tough, amorphous rubbers. The product of Example 8 (5.4 parts) had an RSV of 3.5 and contained, based on sulfur analysis, 12.5% of

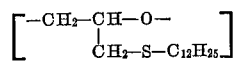

units; the product of Example 9 (5.2 parts) had an RSV of 3.7 and contained, based on sulfur analysis, 10.5% of

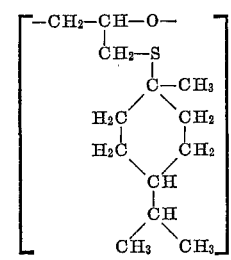

units; and the product of Example 10 (5.0 parts) had an RSV of 4.0 and contained, based on sulfur analysis, 8.0% of

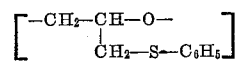

units.

EXAMPLE 11

The procedure of Example 7 was repeated except that 5.0 parts of a crystalline poly(epichlorohydrin) having an RSV of 5.0, a melting point of 122° C., and containing 0.2% of 4,4'-thiobis(3-methyl-6-tert-butylphenol) as stabilizer was used in place of the epichlorohydrin-ethylene oxide copolymer. The acidified water-insoluble product was 5.1 parts of a tough, crystalline solid having an RSV of 3.9 and a melting point based on DTA of 112° C., and contained, based on sulfur analysis, 5.0% of

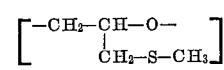

units. The product had improved heat stability in air as compared with the starting polymer.

EXAMPLE 12

Example 7 was repeated except that 0.116 part of ground sodium hydroxide and 0.58 part of primary dodecyl mercaptan were used. The acidified water-insoluble product (4.64 parts) was a rubbery, slippery polymer having an RSV of 1.0 and, based on sulfur analysis, was shown to contain 5.6% of

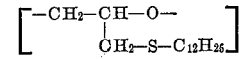

units.

EXAMPLES 13–19

The procedure of Example 7 was repeated except that in these examples varying parts of other mercaptans were substituted for the 0.14 part of methyl mercaptan. Details of the reactants of these examples and the products obtained are recorded below in Table I.

repeating units are monomer units of at least one other cyclic oxide selected from the group consisting of oxiranes,

TABLE I

| Ex. No. | Mercaptan, RSH | | Acidified water-insoluble product | | |
|---|---|---|---|---|---|
| | R | Parts | $\begin{bmatrix} -CH_2-CH-O- \\ \quad\quad\quad\mid \\ \quad\quad\quad CH_2SR \end{bmatrix}$ Units (percent) | RSV | Description |
| 13 | 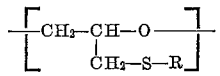—CH$_2$— | 0.36 | 8.1 | 3.1 | Rubber. |
| 14 | ClCH$_2$CH$_2$— | 0.28 | 4.0 | 2.5 | Do. |
| 15 | CH$_2$=CH—CH$_2$— | 0.22 | 6.8 | 3.5 | Do. |
| 16 | H$_3$C—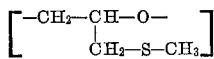— | 0.37 | 7.5 | 2.8 | Do. |
| 17 | Cl—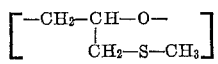— | 0.42 | 8.5 | 3.3 | Do. |
| 18 | CH$_3$OCH$_2$CH$_2$— | 0.27 | 7.6 | 3.4 | Do. |
| 19 | CH$_3$SCH$_2$CH$_2$— | 0.32 | 8.2 | 4.2 | Do. |

EXAMPLE 20

The procedure of Example 7 was repeated except that in this example the copolymer was 5 parts of an epichlorohydrin-ethylene oxide copolymer (10% by weight epichlorohydrin) of RSV 4.5, and the polymer was isolated by adding 30 parts of 3% aqueous hydrogen chloride and 2 volumes of water to the short-stopped reaction mixture, dialyzing the mixture neutral, stripping off the solvent and drying. The product was a tough, partly crystalline, orientable film of a water-soluble thermoplastic having an RSV of 3.1 and containing 3.5% of $$\begin{bmatrix} -CH_2-CH-O- \\ \quad\quad\quad\mid \\ \quad\quad\quad CH_2-S-CH_3 \end{bmatrix}$$

units. It had improved stability as compared with the starting copolymer.

EXAMPLE 21

Example 7 was repeated except that the copolymer was 5 parts of an epichlorohydrin-oxethane copolymer containing 60% by weight of epichlorohydrin and having an RSV of 2.0. The acidified water-insoluble product was a rubber having an RSV of 4.5 and containing 5.5% of $$\begin{bmatrix} -CH_2-CH-O- \\ \quad\quad\quad\mid \\ \quad\quad\quad CH_2-S-CH_3 \end{bmatrix}$$

units.

The foregoing examples illustrate the preparation of the new polyethers containing pendant thioether groups of this invention. These polymers are useful as stabilizers for other polymers such as polyethylene, polypropylene, poly(vinyl chloride), and the like. Additionally, the polyethers which are amorphous and contain a high percentage of epichlorohydrin units (20 to 99.5% and preferably 30 to 99%) are particularly useful as elastomers having improved oxidative stability whereas those containing a high percentage of thioether groups also have improved oil resistance. Moreover, the polyethers which are high in ethylene oxide (50 to 95%) and are water soluble are particularly useful as thickeners, protective colloids, textile sizing agents, paper additives, and the like.

What I claim and desire to protect by Letters Patent is:

1. An essentially linear high molecular weight polyether wherein from 0 to 99.9% of the repeating units are epihalohydrin monomer units, from 0 to 95% of the repeating units are monomer units of at least one other cyclic oxide selected from the group consisting of oxiranes, oxetanes and tetrahydrofurans, and from 0.1 to 100% of the repeating units have the formula $$\begin{bmatrix} -CH_2-CH-O- \\ \quad\quad\quad\mid \\ \quad\quad\quad CH_2-S-R \end{bmatrix}$$

where R is selected from the group consisting of alkyl, cycloalkyl, haloalkyl, alkoxyalkyl, alkylthioalkyl, aralkyl, aryl, alkaryl, haloaryl, alkenyl, and cycloalkenyl radicals.

2. The polyether of claim 1 wherein the epihalohydrin is epichlorohydrin.

3. The polyether of claim 2 wherein the oxirane is an alkylene oxide.

4. The polyether of claim 3 wherein the alkylene oxide is ethylene oxide.

5. The polyether of claim 4 wherein R of the formula is phenyl.

6. The polyether of claim 4 wherein R of the formula is methyl.

7. The polyether of claim 1 wherein from 0 to 99.9% of the repeating units are epichlorohydrin units, and from 0.1 to 100% of the repeating units have the formula $$\begin{bmatrix} -CH_2-CH-O- \\ \quad\quad\quad\mid \\ \quad\quad\quad CH_2S-C_6H_5 \end{bmatrix}$$

8. The polyether of claim 3 wherein the alkylene oxide is ethylene oxide and R is of the formula

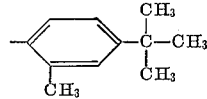

References Cited

UNITED STATES PATENTS 3,275,573  9/1966  Vandenberg _____ 260—79

OTHER REFERENCES

Gaylord: Polyethers, Part III, Polyalkylene Sulfides and Other Polythioethers, pp. 25 and 38, Interscience Publishers, N.Y. 1962.

JAMES A. SEIDLECK, *Primary Examiner.*

M. I. MARQUIS, *Assistant Examiner.*

U.S. Cl. X.R.

260—2, 79.1, 45.7, 897, 899; 117—139.5; 162—164